United States Patent
Van Maanen et al.

(10) Patent No.: US 11,485,216 B2
(45) Date of Patent: Nov. 1, 2022

(54) TRANSMISSION SYSTEM FOR USE IN A HYBRID VEHICLE AND METHOD OF CONTROLLING THE SAME

(71) Applicant: BorgWarner Inc., Auburn Hills, MI (US)

(72) Inventors: Keith Van Maanen, Bloomfield Hills, MI (US); Joel Maguire, Hartland, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/356,628

(22) Filed: Jun. 24, 2021

(65) Prior Publication Data

US 2021/0402864 A1  Dec. 30, 2021

Related U.S. Application Data

(60) Provisional application No. 63/044,128, filed on Jun. 25, 2020.

(51) Int. Cl.
| | |
|---|---|
| *B60K 6/365* | (2007.10) |
| *B60K 6/547* | (2007.10) |
| *B60K 6/383* | (2007.10) |
| *B60K 6/387* | (2007.10) |
| *F16H 61/04* | (2006.01) |
| *B60K 6/48* | (2007.10) |

(52) U.S. Cl.
CPC .............. *B60K 6/365* (2013.01); *B60K 6/383* (2013.01); *B60K 6/387* (2013.01); *B60K 6/547* (2013.01); *B60K 2006/4808* (2013.01); *F16H 2061/0422* (2013.01)

(58) Field of Classification Search
None
See application file for complete search history.

(56) References Cited

U.S. PATENT DOCUMENTS

| | | |
|---|---|---|
| 6,910,981 B2 | 6/2005 | Minagawa et al. |
| 7,004,868 B2 | 2/2006 | Oshidari et al. |
| (Continued) | | |

OTHER PUBLICATIONS

Fremau, Nicolas et al., "2L/100km Eolab to Global PHEV-HEV Project Solution", 2017, 8 pages.

*Primary Examiner* — Dirk Wright
(74) *Attorney, Agent, or Firm* — Howard & Howard Attorneys PLLC (57) ABSTRACT

A transmission system includes an input shaft, a transmission housing, and a planetary gear system rotatably coupled to the input shaft. The planetary gear system has a first and second gear ratio. The transmission system additionally includes an output shaft, a first electric machine, a second electric machine, and a shifting assembly. The shifting assembly includes a first stationary clutch element and a second stationary clutch element. The first electric machine is configured to apply rotational torque to the planetary gear system to synchronize rotational speed of the planetary gear system when moving between the first and second gear ratios, and the second electric machine is configured to provide rotational torque to the output shaft when the first electric machine applies rotational torque to the planetary gear system to synchronize rotational speed of the planetary gear system when moving between the first and second gear ratio.

23 Claims, 6 Drawing Sheets

(56) References Cited

U.S. PATENT DOCUMENTS

| | | |
|---|---|---|
| 7,063,637 B2 | 6/2006 | Yamauchi et al. |
| 7,393,297 B2 | 7/2008 | Raghavan et al. |
| 7,695,387 B2 * | 4/2010 | Oba ........................ B60K 6/445 |
| | | 475/5 |
| 8,172,018 B2 * | 5/2012 | Suzuki ................. B60W 10/115 |
| | | 180/65.265 |
| 8,449,420 B2 | 5/2013 | Seo et al. |
| 8,465,387 B2 | 6/2013 | Conlon |
| 9,033,836 B2 | 5/2015 | Hiraiwa |
| 9,080,650 B2 | 7/2015 | Kienzle et al. |
| 9,221,327 B2 | 12/2015 | Ono et al. |
| 9,499,163 B2 | 11/2016 | Hayashi et al. |
| 9,527,500 B2 | 12/2016 | Hayashi et al. |
| 9,630,487 B2 | 4/2017 | Kanada et al. |
| 9,840,140 B1 | 12/2017 | Holmes et al. |
| 10,018,230 B2 | 7/2018 | Peglowski |
| 10,286,898 B2 | 5/2019 | Ono et al. |
| 10,421,350 B2 | 9/2019 | Morrow et al. |
| 10,710,447 B2 * | 7/2020 | Kasahara ................ B60K 6/445 |
| 10,821,823 B2 * | 11/2020 | Kimes .................. B60W 10/02 |
| 11,052,903 B2 * | 7/2021 | Kasahara ............... B60K 6/442 |
| 11,173,915 B2 * | 11/2021 | Kasahara ............. B60W 20/20 |
| 2018/0312050 A1 | 11/2018 | Endo et al. |
| 2019/0225073 A1 | 7/2019 | Kimes et al. |
| 2019/0351754 A1 | 11/2019 | Hiraiwa |
| 2020/0346631 A1 | 11/2020 | Maguire et al. |

* cited by examiner

|  | MotA | MotB | FE 1 mode | F1 1 mode | B2/4 | FF 2 modes | F34 2 modes |
|---|---|---|---|---|---|---|---|
| 1st | x | x | FW/FE | F1 | Open | FF | Open |
| 2nd | x | x | FW/FE | FW1 | x | FF | Open |
| 3rd | x | x | FW/FE | FW1 | Open | FF | F3 |
| 4th | x | x | FW/FE | FW1 | x | FWF | F3 |
| Rev | Gen | Mot | FW/FE | F1 | Open | Open | Open |

FIG. 6

|  | MotA | MotB | FE 2 mode | F1 2 mode | B2/4 | FF 3 modes | F34 2 modes |
|---|---|---|---|---|---|---|---|
| 1st | x | x | FW/FE | F1 | Open | FF | Open |
| 2nd | x | x | FW/FE | FW1 | x | FF | Open |
| 3rd | x | x | FW/FE | FW1 | Open | FF | F3 |
| 4th | x | x | FW/FE | FW1 | x | FWF | F3 |
| Rev | Mot/Gen | Mot | Open/FE | Lock | Open | Lock/Open | Open |

FIG. 7

TRANSMISSION SYSTEM FOR USE IN A HYBRID VEHICLE AND METHOD OF CONTROLLING THE SAME

CROSS-REFERENCE TO RELATED APPLICATIONS

The subject application claims priority to and all the benefits of U.S. Provisional Application No. 63/044,128 filed on Jun. 25, 2020, the contents of which are incorporated by reference in their entirety.

BACKGROUND OF THE INVENTION

1. Field of the Invention

The present invention generally relates to a transmission system and a method of controlling the same and, more specifically, to a transmission system for use in a hybrid vehicle.

2. Description of the Related Art

Conventional transmission systems of a vehicle include an input shaft configured to be rotatably coupled to a crankshaft of the internal combustion engine, a transmission housing defining a transmission housing interior, a first and second planetary gearset disposed within the transmission housing interior and defining a plurality of gear ratios, and an output shaft rotatably coupled to the input shaft through the gearset to deliver rotational torque to wheels of the vehicle.

In recent years, vehicles have included electric motors to assist the internal combustion engine in providing rotational torque to the wheels of the vehicle under certain driving conditions. Such vehicles are typically referred to as hybrid vehicles. In hybrid vehicles, as the transmission system moves the first and second planetary gearsets between the plurality of gear ratios, the internal combustion engine and/or the electric motor provides rotational torque to the wheels of the vehicle. To move the first and second planetary gearsets between the plurality of gear ratios, traditional transmission systems include a hydraulic control module including a valve body defining a hydraulic circuit, and a plurality of valves. The hydraulic circuit contains hydraulic fluid, and the flow of hydraulic fluid is controlled by the plurality of valves to assist in moving the first and secondary planetary gearsets between the plurality of gear ratios. However, traditional transmission systems are costly and have efficiency losses due to complex components.

As such, there remains a need for an improved transmission system for use in a hybrid vehicle.

SUMMARY OF THE INVENTION AND ADVANTAGES

A transmission system for use in a hybrid vehicle, with the hybrid vehicle including an internal combustion engine including a crankshaft, includes an input shaft configured to be rotatably coupled to the crankshaft of the internal combustion engine, and a transmission housing defining a transmission housing interior. The transmission system also includes a planetary gear system disposed within the transmission housing interior and rotatably coupled to the input shaft, with the planetary gear system having a first and second gear ratio. The transmission system additionally includes an output shaft rotatably coupled to the input shaft through the planetary gear system. The transmission system further includes a first electric machine coupled to and configured to provide rotational torque to the output shaft through the planetary gear system, a second electric machine coupled to and configured to provide rotational torque to the output shaft, and a shifting assembly. The shifting assembly includes a first stationary clutch element selectively rotatably coupled to the planetary gear system and moveable between an engaged state where the first stationary clutch element is rotatably coupled to the planetary gear system and a disengaged state where the first stationary clutch element is rotatably decoupled from the planetary gear system, and a second stationary clutch element selectively rotatably coupled to the planetary gear system and moveable between an engaged state where the second stationary clutch element is rotatably coupled to the planetary gear system and a disengaged state where the second stationary clutch element is rotatably decoupled from the planetary gear system. The first electric machine is configured to apply rotational torque to the planetary gear system to synchronize rotational speed of the planetary gear system when moving between the first and second gear ratios, and the second electric machine is configured to provide rotational torque to the output shaft when the first electric machine applies rotational torque to the planetary gear system to synchronize rotational speed of the planetary gear system when moving between the first and second gear ratio.

A method of controlling the transmission system includes the step of moving at least one of the first stationary clutch element between the engaged and disengaged state and the second stationary clutch element between the engaged and disengaged state. The method also includes the step of applying rotational torque to the planetary gear system with the first electric machine to synchronize rotational speed of the planetary gear system when moving between the first and second gear ratios. The method additionally includes the step of applying rotational torque to the output shaft with the second electric machine when the first electric machine applies rotational torque to the planetary gear system to synchronize rotational speed of the planetary gear system when moving between the first and second gear ratio.

Accordingly, having the first electric machine configured to apply rotational torque to the planetary gear system to synchronize rotational speed of the planetary gear system when moving between the first and second gear ratios, and having the second electric machine configured to provide rotational torque to the output shaft when the first electric machine applies rotational torque to the planetary gear system to synchronize rotational speed of the planetary gear system when moving between the first and second gear ratio reduces the overall size and cost of the transmission system.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Figure 1:
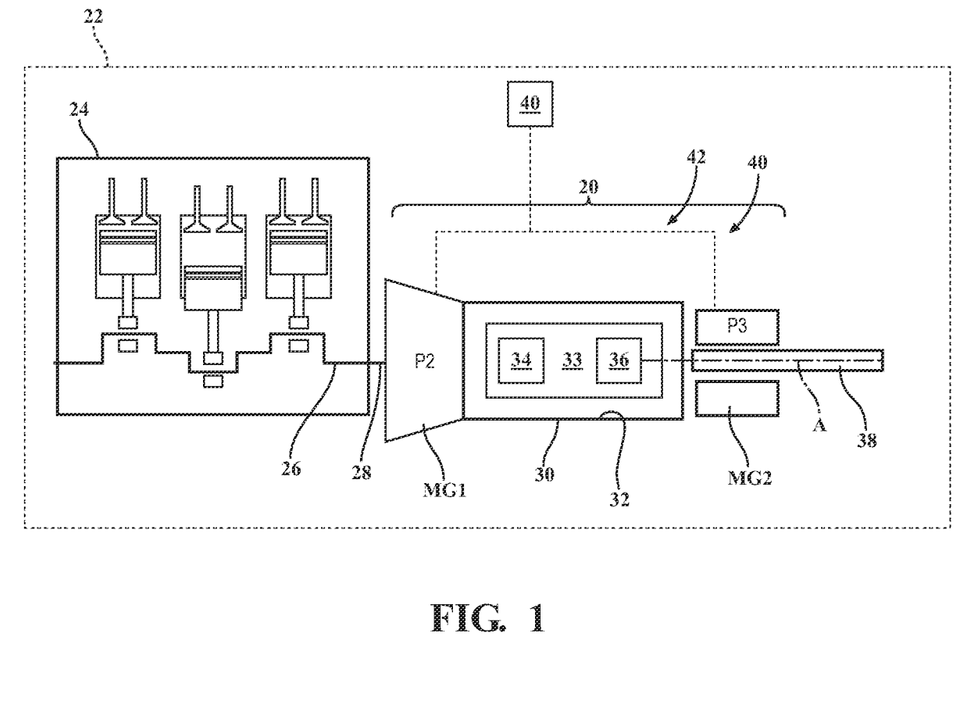
FIG. 1 is a schematic drawing of a transmission system of for use in a hybrid vehicle, with the hybrid vehicle including an internal combustion engine including a crankshaft, and with the transmission system including an input shaft configured to be rotatably coupled to the crankshaft, a transmission housing defining a transmission housing interior, an output shaft rotatably coupled to the input shaft, a first electric machine, and a second electric machine.

With reference to the Figures, wherein like numerals indicate like parts throughout the several views, a transmission system 20 for use in a hybrid vehicle 22 is generally shown in FIG. 1. The hybrid vehicle 22 includes an internal combustion engine 24, with the internal combustion engine 24 including a crankshaft 26. The hybrid vehicle 22 may be a plug-in hybrid electric vehicle (PHEV). The transmission system 20 also includes an input shaft 28 configured to be rotatably coupled to the crankshaft 26 of the internal combustion engine 24, and a transmission housing 30 defining a transmission housing interior 32.

Figure 2:
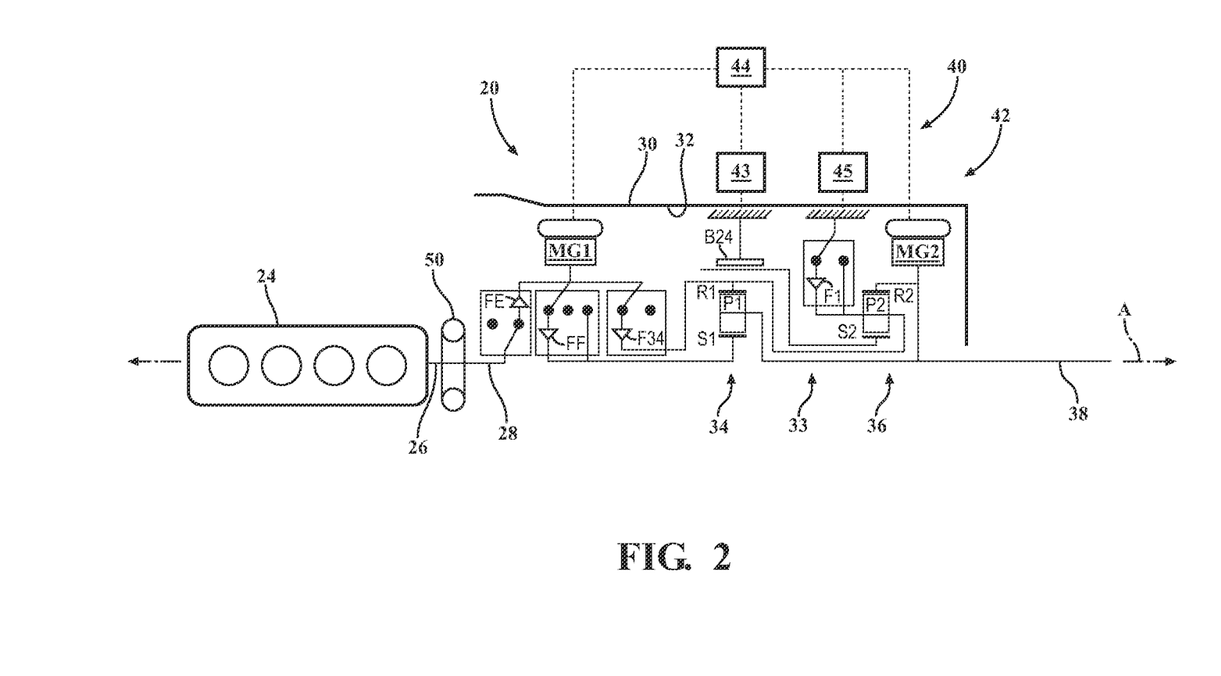
FIG. 2 is a schematic drawing of the transmission system, with the transmission system further including a first planetary gearset disposed within the transmission housing interior and rotatably coupled to the input shaft, and a second planetary gearset disposed within the transmission housing interior and rotatably coupled to the first planetary gearset.

With reference to FIG. 2, the transmission system 20 additionally includes a planetary gear system 33 disposed within the transmission housing interior 32 and rotatably coupled to the input shaft 28, with the planetary gear system 33 having a first and second gear ratio different from the first gear ratio. The planetary gear system 33 may include a first planetary gearset 34 rotatably coupled to the input shaft 28, and a second planetary gearset 36 rotatably coupled to the first planetary gearset 34. When present, the first planetary gearset 34 typically includes a first sun gear S1, and first planet gear P1, and a first ring gear R1, and the second planetary gearset 36 typically includes a second sun gear S2, second planet gear P2, and a second ring gear R2. Additionally, when present, the first planetary gearset 34 is rotatably coupled to the input shaft 28 and the output shaft 38, and a second planetary gearset 36 rotatably coupled to the first planetary gearset 34, the input shaft 28, and the output shaft 38. In such embodiments, the first and second planetary gearsets 34, 36 have the first and second gear ratios.

The transmission system 20 further includes an output shaft 38 rotatably coupled to the input shaft 28 through the planetary gear system 33 and, when present, the first and second planetary gearsets 34, 36. The output shaft 38 delivers rotational torque to wheels (not shown) of the hybrid vehicle 22. The transmission system 20 also includes a first electric machine MG1 coupled to and configured to provide rotational torque to the output shaft 38 through the planetary gear system 33 and a second electric machine MG2 coupled to and configured to provide rotational torque to the output shaft 38. It is to be appreciated that the second electric machine MG2 may be configured to provide rotational torque to the output shaft 38 through the planetary gear system 33, such as through the second planetary gearset 36, or through direct rotational coupling to the output shaft 38.

The first electric machine MG1 may be configured both as an electric motor to provide rotational torque to the output shaft 38, and optionally as a generator. Similarly, the second electric machine MG2 may be configured both as an electric motor to provide rotational torque to the output shaft 38, and as a generator to convert mechanical movement of the output shaft 34 into electrical energy.

In one embodiment, the output shaft 38 extends along an axis A, and the first electric machine MG1 is disposed between the first planetary gearset 34 and the input shaft 28 with respect to the axis A. In embodiments, the first electric machine MG1 may be referred to as a P2 module, as particularly shown in FIG. 1. The second electric machine MG2 may be disposed between the second planetary gearset 36 and the output shaft 38 with respect to the axis A. In such embodiments, the second electric machine MG2 may be referred to as a P3 hybrid module, as particularly shown in FIG. 1.

With reference to FIG. 2, the transmission system 20 further includes a shifting assembly 40. The shifting assembly 40 includes a first stationary clutch element B24 selectively rotatably coupled to the planetary gear system 33 and moveable between an engaged state where the first stationary clutch element B24 is rotatably coupled to the planetary gear system 33 and a disengaged state where the first stationary clutch element B24 is rotatably decoupled from the planetary gear system. Typically, when the first planetary gearset 34 is present, the first stationary clutch element B24 is selectively rotatably coupled to the first planetary gearset 34 and is moveable between an engaged state where the first stationary clutch element B24 is rotatably coupled to the first planetary gearset 34 and a disengaged state where the first stationary clutch element B24 is rotatably decoupled from the first planetary gearset 34. Specifically, the first stationary clutch element B24 may be selectively rotatably coupled to the second sun gear S2. It is appreciated that the disengaged state may be referred to as an open position and that the engaged state may be referred to as a closed position, as described in further detail below. The shifting assembly 40 also includes a second stationary clutch element F1 selectively rotatably coupled to the planetary gear system 33 and moveable between an engaged state where the second stationary clutch element F1 is rotatably coupled to the planetary gear system 33 and a disengaged state where the second stationary clutch element F1 is rotatably decoupled from the planetary gearset 33. Typically, when the second planetary gearset 36 is present, the second stationary clutch element F1 is selectively rotatably coupled to the second planetary gearset 36 and is moveable between an engaged state where the second stationary clutch element F1 is rotatably coupled to the second planetary gearset 36 and a disengaged state where the second stationary clutch element F1 is rotatably decoupled from the second planetary gearset 36. Specifically, the second stationary element F1 may be selectively rotatably coupled to the second planet gear P2. Additionally, the second stationary element F1 may be selectively rotatably coupled to the first planetary gearset 33 and, in particular, the first ring gear R1 of the first planetary gearset 33. It is to be appreciated that the disengaged state may be referred to as an open or freewheeling position and that the engaged state may be referred to as a closed position, as described in further detail below.

It is to be appreciated that the shifting assembly 40, the transmission housing 30, and the planetary gear system 33 may collectively define a transmission 42. In some embodiments, where the transmission system 20 includes the first and second electric machines MG1, MG2, the transmission 42 may be commonly referred to as a dedicated hybrid transmission (DHT). In such embodiments, when the transmission 42 is further defined as a DHT, the DHT is configured specifically to be used with a first and second electric machines MG1, MG2 and is specifically configured to operate with the first and second electric machine MG1, MG2, as described in further detail below. When the transmission 42 is further defined as a DHT, the transmission 42 combines the use of the internal combustion engine 24 and the first and second electric machines MG1, MG2 to efficiently propel the vehicle and to reduce CO2 emissions all while increasing fuel economy and decreasing the brake specific fuel consumption (BSFC) of the hybrid vehicle 22.

The first electric machine MG1 is configured to apply rotational torque to the planetary gear system 33 to synchronize rotational speed of the planetary gear system 33 when moving between the first and second gear ratios. The second electric machine MG2 is configured to provide rotational torque to the output shaft 38 when the first electric machine MG1 applies rotational torque to the planetary gear system 33 to synchronize rotational speed of the planetary gear system 33 when moving between the first and second gear ratio. Having the first electric machine MG1 configured to apply rotational torque to the planetary gear system 33 to synchronize rotational speed of the planetary gear system 33 when moving between the first and second gear ratios, and having the second electric machine MG2 configured to provide rotational torque to the output shaft 38 when the first electric machine MG1 applies rotational torque to the planetary gear system 33 to synchronize rotational speed of the planetary gear system 33 when moving between the first and second gear ratio reduces the overall size and cost of the transmission system 20 and, specifically, the transmission 42 as the first and second electric machines MG1, MG2 are able to perform functions that are typically performed by more complex and costly designs. For example, in one embodiment, the transmission system 20 is free of a hydraulic control module including a valve body defining a hydraulic circuit. In embodiments where the planetary gear system 33 includes the first and second planetary gearsets 34, 36, the first electric machine MG1 may be configured to apply rotational torque to the first planetary gearset 34 to synchronize rotational speed of the first planetary gearset 34 when moving between the first and second gear ratios.

In one embodiment, the shifting assembly 40 includes a first electromechanical actuator 43 operably coupled to the first stationary clutch element B24 to move the first stationary clutch element B24 between the engaged and disengaged states, and a second electromechanical actuator 45 operably coupled to the second stationary clutch element F1 to move the second stationary clutch element F1 between the engaged and disengaged state. Having the first and second electromechanical actuators 43, 45 operably coupled to the first and second stationary clutch elements B24, F1, respectively, to move the first and second stationary clutch elements B24, F1 between their engaged and disengaged states allows for a more compact, lighter weight, and lower cost transmission system 20 as the first and second electromechanical actuators 43, 45 perform the function of a traditional hydraulic control module. Having the transmission system 20 free of a traditional hydraulic control module allows the transmission 42 to be defined as a DHT because the transmission system 20 is specifically designed to operate with the first and second electric machines MG1, MG2, including the use of the first and second electric machines MG1, MG2 as described above, and by using the first and second electromechanical actuators 43, 45 to move the first and second stationary clutch elements B24, F1 between their engaged and disengaged states. It is to be appreciated that when the first and second gear ratios are first and second gears of the transmission 42, the second electromechanical actuator 45 is typically not needed to move the second stationary clutch element F1 between the engaged and disengaged state as the transmission 42 is able to move between the first and second gears. Typically, only the first electromechanical actuator 43 is needed to move the first stationary clutch element B24 between the engaged and disengaged state to move between the first and second gears. Additionally, when the first and second gear ratios are second and third gears of the transmission, the first and second electromechanical actuators 43, 45 are typically needed to move the first and second stationary clutch elements B24, F1, respectively, between their engaged and disengaged states.

Having the first electric machine MG1 configured to apply rotational torque to the planetary gear system 33 to synchronize rotational speed of the planetary gear system 33 when moving between the first and second gear ratios, and having the second electric machine MG2 configured to provide rotational torque to the output shaft 38 when the first electric machine MG1 applies rotational torque to the planetary gear system 33 to synchronize rotational speed of the planetary gear system 33 when moving between the first and second gear ratio offers several advantages. First, the transmission system 20 provides a high torque and high-power density when compared to traditional transmissions including multi-plate friction clutches, as the first and/or second electric machine MG1, MG2 is able to provide rotational torque to the output shaft 38 in addition to the internal combustion engine 24. Second, as mentioned above, in embodiments where the transmission system 20 free of a traditional hydraulic control module, which is typically used in traditional transmission including multi-plate friction clutches, parasitic losses (e.g., from a pump) as well as frictional losses from multi-plate friction clutches are avoided, which overall increases efficiency of the hybrid vehicle 20.

Figure 7:
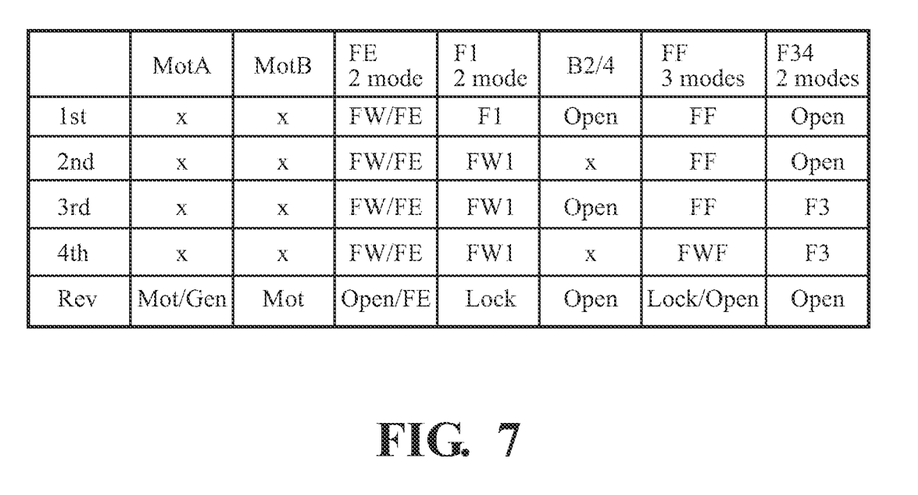
FIG. 7 is a table illustrating various modes of operation of the transmission system.

In one embodiment, the second stationary clutch element F1 is further defined as a one-way clutch. In such embodiments, having the second stationary clutch element F1 further defined as the one-way clutch allows a reduction in mechanical losses when compared to traditional friction clutches. Even further, when the second stationary clutch element F1 is further defined as a one-way clutch, the first or second electric machine MG1, MG2 may synchronize the rotating clutch element F1 when the first and second planetary gearsets 34, 36 move between the gear ratios. Typically, the second electric machine MG2 synchronizes the second stationary clutch element F1. In some embodiments, the second stationary clutch element F1 is further defined as a selectable one-way clutch. In such embodiments, as shown in FIG. 7, having the second stationary clutch element F1 further defined as the selectable one-way clutch, the rotating clutch element F1 is able to transfer rotational torque in both directions, rather just in a single direction as with a one-way clutch, which allows rotational torque to be transferred from the crankshaft 26 and/or first and second electric machines MG1, MG2 to the output shaft 38 when the selectable one-way clutch rotates in a first direction, and allows rotational torque to be transferred from the output shaft 38 to the crankshaft 26 to allow engine braking and/or regeneration when the selectable one-way clutch rotates in a second direction opposite from the first direction. Having the second stationary clutch element F1 further defined as the selectable one-way clutch also allows a reverse gear capability as the second stationary clutch element F1 is able to be locked in both rotational directions, as illustrated in FIG. 7.

In one embodiment, the first stationary clutch element B24 is defined as a clutch band. In such embodiments, the first stationary clutch element B24 is actuatable between the engaged and disengaged state, such as with the first electromechanical actuator 43. In other words, the clutch band may be referred to an electromagnetically actuated clutch band because in such embodiments the first electromechanical actuator 43 actuates the clutch band between the engaged and disengaged state. As described above, having the stationary clutch element B24 and, in this embodiment, the clutch band electromechanically actuated eliminates the need for more complex mechanisms, such as a hydraulic control module.

With continued reference to FIG. 2, the shifting assembly 40 of the transmission system 20 may further include a first rotating clutch element FF selectively rotatably coupled to the planetary gear system 33 and, in some embodiments, to the first planetary gearset 34. In one embodiment, the first rotating clutch element FF is further defined as a one-way clutch. In such embodiments, as described above, having the first rotating clutch element FF further defined as the one-way clutch allows a reduction in mechanical losses when compared to traditional friction clutches. The first rotating clutch element FF may be further defined as a selectable one-way clutch. Having the first rotating clutch element FF further defined as a selectable one-way clutch, as described above, allows the first rotating clutch element FF to carry torque in both rotational directions and be rotatably decoupled in both rotational directions. For example, in forward gears of the vehicle, the first rotating clutch element FF operates as a one-way clutch, however, when the shifting assembly 40 needs to go into a reverse gear, the first rotating clutch element FF is able to be open or locked when in the reverse gear. Then, whether the first rotating clutch element FF is locked depends on whether both the first and second electric machines MG1, MG2 are both working as a motor (first rotating clutch element FF is locked), or the first electric machine MG1 is acting as a generator and MG2 is acting as a motor in series (first rotating clutch element FF is open). To have the first electric machine MG1 operate as a generator, for example, the first, second, and third rotating clutch elements FF, F34, and FE may be open, open, and closed, respectively.

The shifting assembly 40 of the transmission system 20 may further include a second rotating clutch element F34 selectively rotatably coupled to the planetary gear system 33 and, in some embodiments, to the first planetary gearset 34. In one embodiment, the second rotating clutch element F34 may be further defined as a selectable one-way clutch. Having the second rotating clutch element F34 further defined as a selectable one-way clutch, as described above, allows the second rotating clutch element F34 to carry torque in both rotational directions and be rotatably decoupled in both rotational directions. For example, when the shifting assembly 40 is in first or second gear, the second rotating clutch element F34 is open and caries no torque in either the forward (first or second gear) or reverse (reverse gear) direction of the hybrid vehicle 22. Then, when the shifting assembly is in the third or fourth gear, the second rotating clutch element F34 carries torque in one direction (forward direction) to provide rotational torque to the wheels of the hybrid vehicle 22.

The shifting assembly 40 of the transmission system 20 may further include a third rotating clutch element FE selectively rotatably coupled to the planetary gear system 33 and, in some embodiments, the first planetary gearset 34. In one embodiment, the third rotating clutch element FE is further defined as a disconnect clutch, which allows the internal combustion engine 24 to be rotatably decoupled (i.e., disconnected) from the input shaft 28, configured to be rotatably coupled the crankshaft 26 and the input shaft 28 for selectively rotatably coupling the crankshaft 26 and the input shaft 28. The third rotating clutch element FE may be further defined as a one-way clutch, which allows a reduction in mechanical losses when compared to traditional friction clutches. The third rotating clutch element FE may be further defined as a selectable one-way clutch. Having the fourth rotating clutch element is further defined as a selectable one-way clutch, as described above, allows the third rotating clutch element FE to carry torque in both rotational directions and be rotatably decoupled in both rotational directions.

With reference to FIG. 1, the transmission system 20 may further include an electronic control unit 44 electrically coupled to the first and second stationary clutch elements B24, F1 to move the first and second stationary clutch elements B24, F1 between the engaged and disengaged state. In embodiments where the first and second electromechanical actuators 43, 45 are present, as shown in FIG. 2, the electronic control unit is electrically coupled to the first and second electromechanical actuators 43, 45 to move the first and second stationary clutch elements B24, F1 between the engaged and disengaged state. With reference to FIG. 2, in embodiments including the first, second, and/or third rotating clutch elements FF, F34, FE, it is to be appreciated that the first, second, and/or third rotating clutch elements FF, F34, FE may be electromechanically actuated, such as by the first electromechanical actuator 43, when present.

In one embodiment, the transmission system 20 may include a torque converter in the position of the third rotating clutch element FE, as shown in FIG. 2. It is to be appreciated in embodiments including the torque converter that the torque converter may replace the third rotating clutch FE, or the torque converter may be in series with the third rotating clutch element FE. Having the torque converter and the third rotating clutch element FE allows a full engine disconnect mode, which is often desirable for hybrid vehicles.

Figure 3:
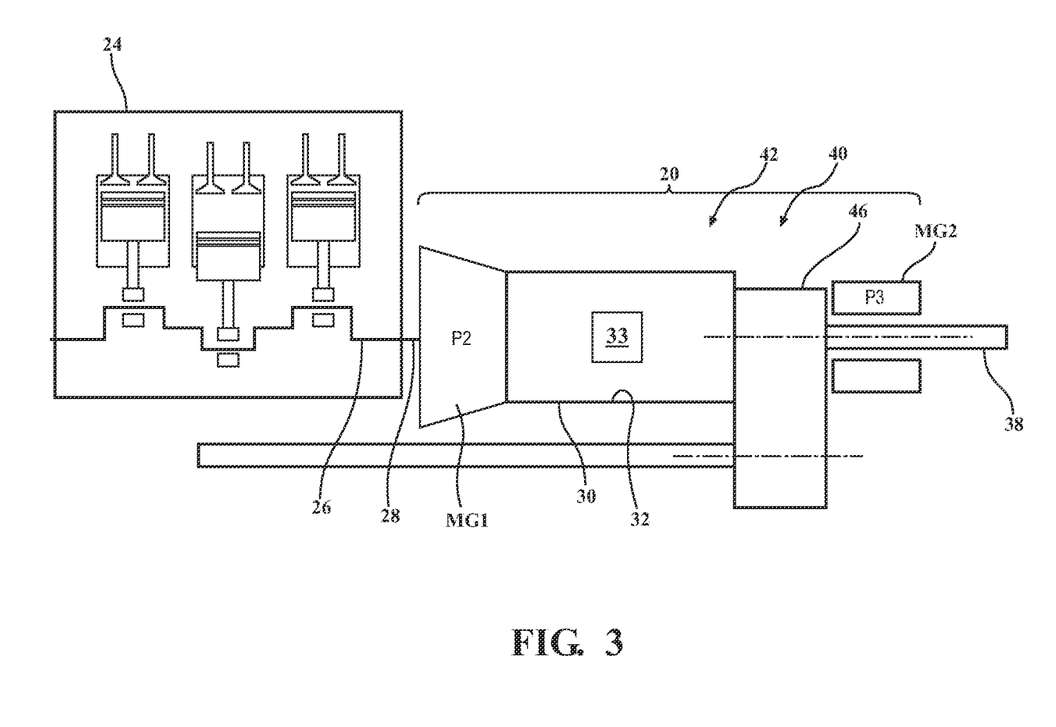
FIG. 3 is a schematic drawing of the transmission system, with the transmission system further including a transfer case coupled to the transmission housing.

As shown in FIG. 3, the transmission system 20 may include a transfer case 46 coupled to the transmission housing 30. In one embodiment, the transfer case 46 is disposed between the second electric machine MG2 and the transmission housing 30 with respect to the axis A. In embodiments including the transfer case 46, the hybrid vehicle 22 may be an all-wheel drive vehicle. In such embodiments, typically the second electric machine MG2 is a P3 module, as described above. In embodiments where the transfer case 46 is coupled to the transmission housing 30, the second electric machine MG2 may be applied to any longitudinal drivetrain.

With reference to FIG. 2, the transmission system 20 may include an input damper 50 coupled to the input shaft 28.

In one embodiment, the transmission system 20 may include a permanently engaged starter. The permanently engaged starter typically includes a starter pinion meshingly engaged to a ring gear that is mounted to a flex plate or flywheel. An example of a permanently engaged starter is disclosed in U.S. Pat. No. 10,018,230 filed on Sep. 13, 2016, the disclosure of which is incorporated by reference in its entirety.

In one embodiment, the planetary gear system 33, and in some embodiments the first and second planetary gearsets 34, 36, has four gear ratios. In embodiments with the first and second planetary gearsets 34, 36 have the first gear ratio, the second gear ratio, a third gear ratio, and a fourth gear ratio. When the planetary gear system 33 has the first gear ratio, second gear ratio, third gear ratio, and fourth gear ratio, the transmission 42 is a four-speed transmission. Examples of four gear ratios are shown in the lever diagram of FIG. 4. When the planetary gear system 33 has the first, second, third, and fourth gear ratios, the transmission system 20 is able to efficiently charge the battery of the hybrid vehicle 22. Additionally, having the first, second, third, and fourth gear ratio allows the torque of the first electric machine MG1 to be multiplied to achieve a higher output torque than would be possible in a transmission system having less than four gear ratios, such as only two gear ratios. In one embodiment, the first electric machine MG1 is able to provide an electric only launch, and is able to provide a high level of acceleration due to the utilization of multiple gear ratios, and in particular when the internal combustion engine 24 is providing rotational torque to the input shaft 28. It is to be appreciated that only the second electric machine MG2 may also provide an electric only launch, and that the first electric machine MG1 and second electric machine MG2 may both provide an electric only launch.

In one embodiment, as shown in FIG. 3, the first gear ratio is greater than the second gear ratio, the second gear ratio is greater than the third gear ratio, and the third ratio is greater than the fourth gear ratio. In such embodiments, the first electric machine MG1 may be configured to apply rotational torque to the planetary gear system 33 to synchronize rotational speed of the planetary gear system 33 when moving between the second gear ratio and the third gear ratio.

Figure 6:
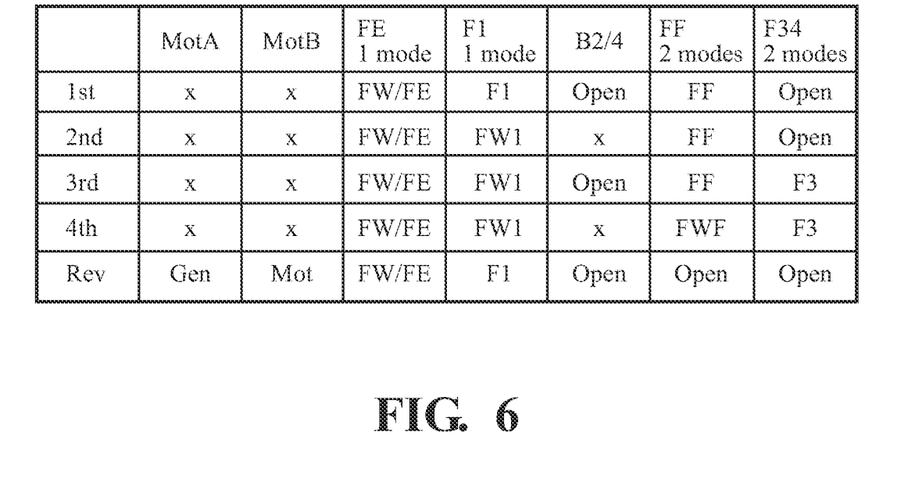
FIG. 6 is a table illustrating various modes of operation of the transmission system.

With reference to FIG. 6, the table represents various operating modes of the transmission system 20 having four gear ratios. The table in FIG. 6 generally represents various operating modes for a car with limited need for reverse torque. In particular, the MotA column refers to the first electric machine MG1, the MotB column refers to the second electric machine MG2, the FE column refers to the third rotating clutch element FE, the F1 column refers to the rotating clutch element F1, the B2/4 column refers to the stationary clutch element B24, the FF column refers to the first rotating clutch element FF, and the F34 column refers to the second rotating clutch element F34. The first and second electric machines MG1, MG2 may provide rotational torque to the output shaft in any of the first, second, third, and fourth gear ratios, and the second electric machine MG2 may provide rotational torque to the output shaft 38 when in the reverse gear, as shown in FIG. 6.

With respect to the third rotating clutch element FE, which in some embodiments is further defined as a disconnect clutch, the third rotating clutch element FE may free wheel (FW) or be fully engaged (FE) in the first, second, third, and fourth gear ratios of the transmission 42. It is to be appreciated that free wheel is equivalent to the disengaged position described above and fully engaged is equivalent to the engaged position described above. With respect to the reverse gear of the transmission 42, the third rotating clutch element FE may be open (disengaged position) or fully engaged (engaged position).

With respect to the rotating clutch element F1, the rotating clutch element F1 is in the engaged state (represented by F1) in first gear, freewheels (disengaged) in the second, third, and fourth gear of the transmission 42, and is locked when the transmission 42 is in the reverse gear.

With respect to the stationary clutch element B24, the stationary clutch element B24 is open (disengaged state) when the transmission 42 is in the first, third, and reverse gear, and is closed (engaged state) when the transmission 42 is in the second and fourth gear.

With respect to the first rotating clutch element FF, the first rotating clutch element FF is in the engaged state (represented by FF) when the transmission is in the first, second, and third gear, is in the disengaged state (freewheel represented by FWF) when the transmission 42 is in fourth gear, and is open (disengaged state) when the transmission 42 is in reverse.

With respect to the second rotating clutch element F34, the second rotating clutch element F34 is open (disengaged state) when the transmission 42 is in first, second, and reverse gear, and is in the engaged state (represented by F3) when the transmission 42 is in third and fourth gear.

Figure 4:
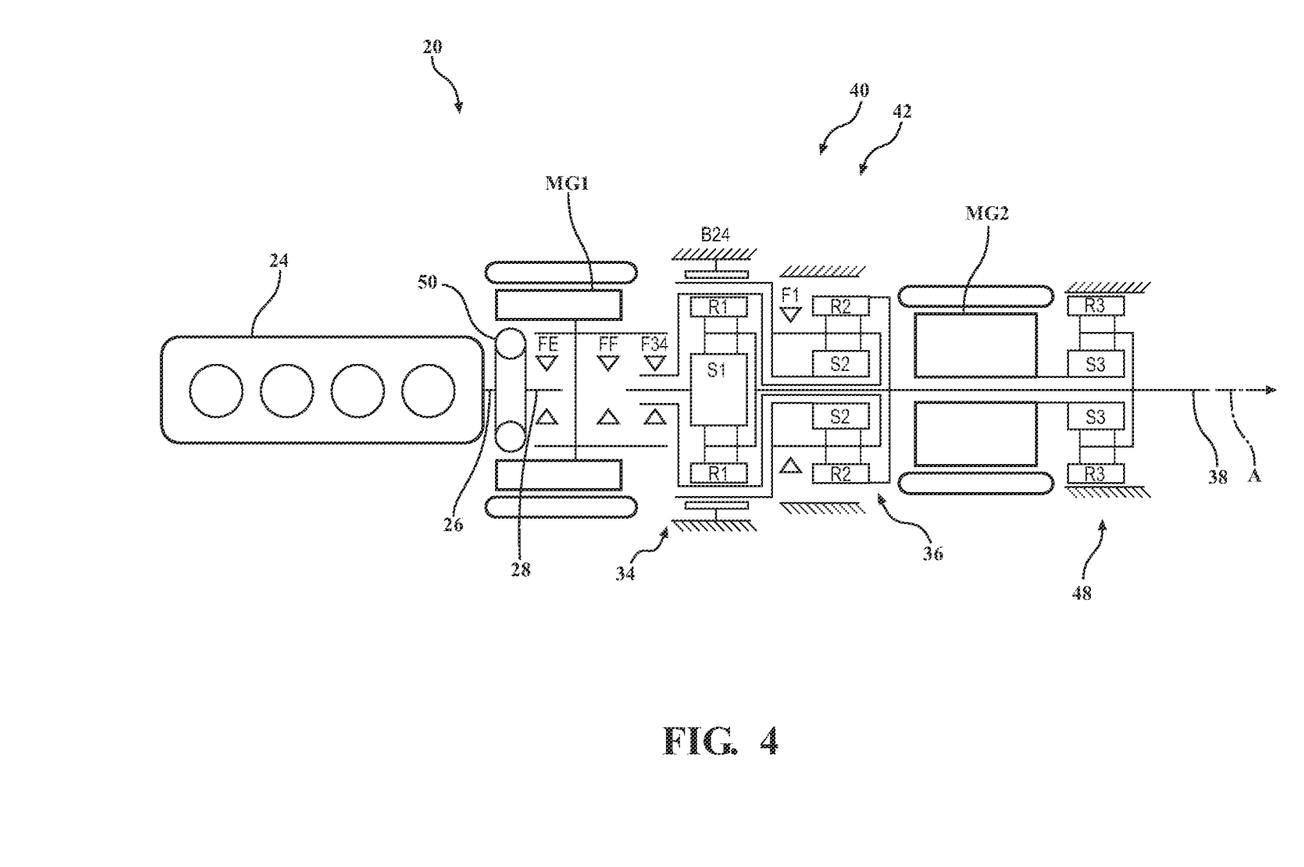
FIG. 4 is a schematic drawing of the transmission system, with the transmission system further including a third planetary gearset.
Figure 5:
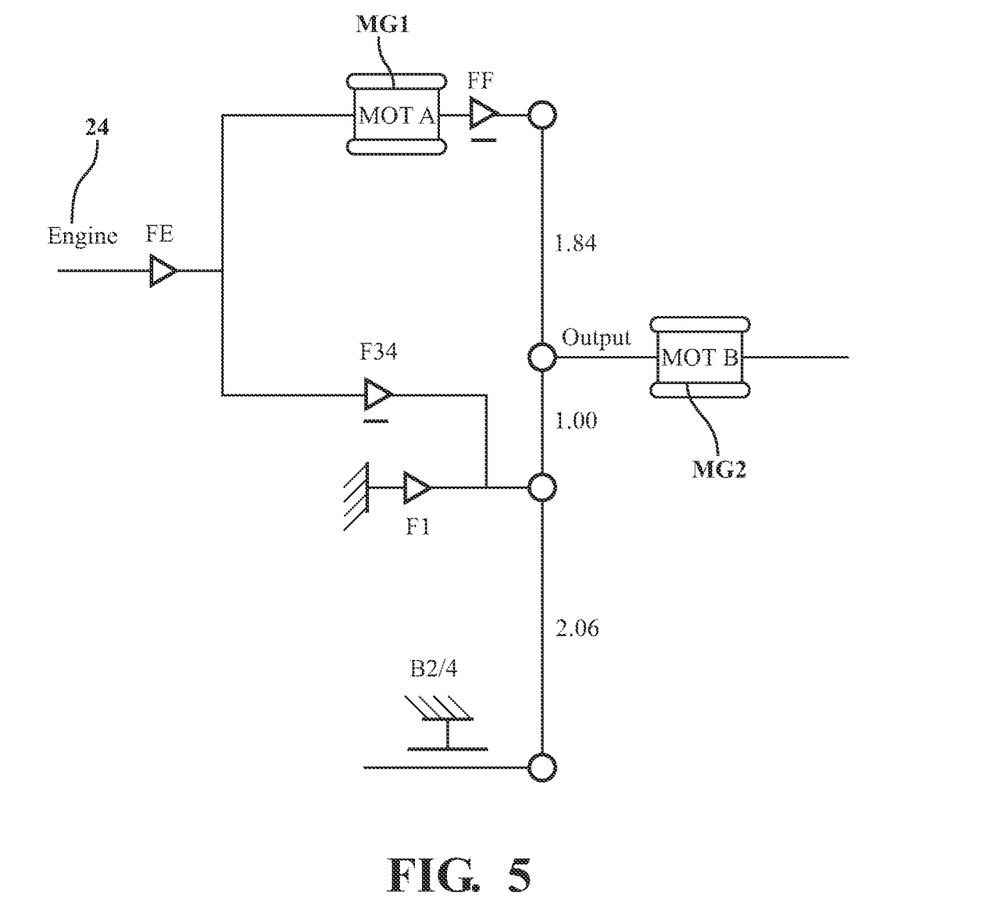
FIG. 5 is a schematic drawing of a lever diagram of the transmission system.

With reference to FIG. 7, the table represents various modes of operation of the transmission system. The table in FIG. 7 is essentially the same as the table in FIG. 6, except the table in FIG. 7 differs in the various modes of operation when the transmission 42 is in reverse. In particular, the table in FIG. 7 represents various modes of operation of the transmission system 20 for hybrid vehicle, such as a truck, that has a need for higher reverse torque (e.g., >3,500 Nm wheel torque). For example, as shown in FIG. 4, the planetary gear system 33 may include a third planetary gearset 48, which typically includes a third ring gear R3 and third sun gear S3, which allows the transmission system 20 to allow different torque and/or speed relationships for MG2 through the planetary gear system 33. In particular, when the transmission system 20 is in the reverse gear, the first and/or second electric machine MG1, MG2 may be used to propel the hybrid vehicle 22 in reverse, and the internal combustion engine 24 may alone or in combination with MG2 be used to propel the hybrid vehicle 22 in reverse. If the internal combustion engine 24 is not used for reverse and the first rotating clutch element FF is locked, then MG2 may be used to propel the hybrid vehicle 22 in reverse. If the internal combustion engine 24 is used for reverse, then the first electric machine MG1 may be used as a generator with the first, second, and third rotating clutch elements FF, F34, and FE being open, open, and closed, respectively, and the second electric machine MG2 may optionally be used to also propel the hybrid vehicle 22 in reverse. As also shown in FIG. 4, the second electric machine MG2 is able to provide a fixed gear ratio between MG2 and the output shaft 38.

A method of controlling the transmission system 20 includes the steps of moving at least one of the first stationary clutch element B24 between the engaged and disengaged state and the second stationary clutch element F1 between the engaged and disengaged state, applying rotational torque to the planetary gear system 33 with the first electric machine MG1 to synchronize rotational speed of the planetary gear system 33 when moving between the first and second gear ratios, and applying rotational torque to the output shaft 38 with the second electric machine MG2 when the first electric machine MG1 applies rotational torque to the planetary gear system 33 to synchronize rotational speed of the planetary gear system 33 when moving between the first and second gear ratio. The method may also include the step of controlling the application of torque of the first and second electric machines MG1, MG2 with the electronic control unit 44. The method may further include the step of moving the first stationary clutch element B24 between the engaged and disengaged states with the first electromechanical actuator 43 and moving the second stationary clutch element F1 between the engaged and disengaged states with the second electromechanical actuator 45.

What is claimed is:

1. A transmission system for use in a hybrid vehicle, with the hybrid vehicle comprising an internal combustion engine comprising a crankshaft, said transmission system comprising:
    an input shaft configured to be rotatably coupled to the crankshaft of the internal combustion engine;
    a transmission housing defining a transmission housing interior;
    a planetary gear system disposed within said transmission housing interior and rotatably coupled to said input shaft, with said planetary gear system having a first and second gear ratio;
    an output shaft rotatably coupled to said input shaft through said planetary gear system;
    a first electric machine coupled to and configured to provide rotational torque to said output shaft through said planetary gear system;
    a second electric machine coupled to and configured to provide rotational torque to said output shaft; and
    a shifting assembly comprising,
        a first stationary clutch element selectively rotatably coupled to said planetary gear system and moveable between an engaged state where said first stationary clutch element is rotatably coupled to said planetary gear system and a disengaged state where said first stationary clutch element is rotatably decoupled from said planetary gear system,
        a second stationary clutch element selectively rotatably coupled to said planetary gear system and moveable between an engaged state where said second stationary clutch element is rotatably coupled to said planetary gear system and a disengaged state where said second stationary clutch element is rotatably decoupled from said planetary gear system;
    wherein said first electric machine is configured to apply rotational torque to said planetary gear system to synchronize rotational speed of said planetary gear system when moving between said first and second gear ratios; and
    wherein said second electric machine is configured to provide rotational torque to said output shaft when said first electric machine applies rotational torque to said planetary gear system to synchronize rotational speed of said planetary gear system when moving between said first and second gear ratio.

2. The transmission system as set forth in claim 1, wherein said shifting assembly further comprises a first electromechanical actuator operably coupled to said first stationary clutch element to move said first stationary clutch element between said engaged and disengaged states, and a second electromechanical actuator operably coupled to said second stationary clutch element to move said second stationary clutch element between said engaged and disengaged state.

3. The transmission system as set forth in claim 1, wherein said planetary gear system comprises a first planetary gearset rotatably coupled to said input shaft and said output shaft, and a second planetary gearset rotatably coupled to said first planetary gearset, said input shaft, and said output shaft, and wherein said first and second planetary gearsets have said first and second gear ratios.

4. The transmission system as set forth in claim 3, wherein said first electric machine is configured to apply rotational torque to said first planetary gearset to synchronize rotational speed of said first planetary gearset when moving between said first and second gear ratios.

5. The transmission system as set forth in claim 1, wherein said planetary gear system further has a third and fourth gear ratio.

6. The transmission system as set forth in claim 1, wherein said second stationary clutch element is further defined as a one-way clutch.

7. The transmission system as set forth in claim 6, wherein said second stationary clutch element is further defined as a selectable one-way clutch.

8. The transmission as set forth in claim 1, wherein said shifting assembly further comprises a first rotating clutch element selectively rotatably coupled to said planetary gear system.

9. The transmission system as set forth in claim 8, wherein said first rotating clutch element is further defined as a one-way clutch.

10. The transmission system as set forth in claim 9, wherein said first rotating clutch element is further defined as a selectable one-way clutch.

11. The transmission system as set forth in claim 1, wherein said shifting assembly further comprises a second rotating clutch element selectively rotatably coupled to said first planetary gearset.

12. The transmission system as set forth in claim 11, wherein said second rotating clutch element is further defined as a selectable one-way clutch.

13. The transmission system as set forth in claim 1, wherein said shifting assembly further comprises a third rotating clutch element selectively rotatably coupled to said first planetary gearset.

14. The transmission system as set forth in claim 13, wherein said third rotating clutch element is further defined as a disconnect clutch configured to be rotatably coupled the crankshaft and said input shaft for selectively rotatably coupling said crankshaft and said input shaft.

15. The transmission system as set forth in claim 13, wherein said third rotating clutch element is further defined as a one-way clutch.

16. The transmission system as set forth in claim 15, wherein said third rotating clutch element is further defined as a selectable one-way clutch.

17. The transmission system as set forth in claim 1, wherein said first stationary clutch element is further defined as a clutch band.

18. The transmission system as set forth in claim 1, further comprising a permanently engaged starter.

19. The transmission system as set forth in claim 1, wherein said output shaft extends along an axis, and wherein said first electric machine is disposed between said first planetary gearset and said input shaft with respect to said axis.

20. The transmission system as set forth in claim 1, wherein said second electric machine is disposed between said second planetary gearset and said output shaft with respect to an axis.

21. The transmission system as set forth in claim 1, further comprising an electronic control unit electrically coupled to said first and second stationary clutch elements to move said first and second stationary clutch elements between said engaged and disengaged state.

22. The transmission system as set forth in claim 1 being free of a hydraulic control module comprising a valve body defining a hydraulic circuit.

23. A method of controlling the transmission system as set forth in claim 1, the method comprising the steps of:
- moving at least one of the first stationary clutch element between the engaged and disengaged state and the second stationary clutch element between the engaged and disengaged state;
- applying rotational torque to said planetary gear system with said first electric machine to synchronize rotational speed of said planetary gear system when moving between said first and second gear ratios; and
- applying rotational torque to said output shaft with said second electric machine when said first electric machine applies rotational torque to said planetary gear system to synchronize rotational speed of said planetary gear system when moving between said first and second gear ratio.

* * * * *